(12) United States Patent
Das

(10) Patent No.: US 11,392,577 B2
(45) Date of Patent: Jul. 19, 2022

(54) REAL-TIME ANOMALY DETECTION

(71) Applicant: Intuit Inc., Mountain View, CA (US)

(72) Inventor: Debasish Das, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 176 days.

(21) Appl. No.: 16/933,824

(22) Filed: Jul. 20, 2020

(65) Prior Publication Data

US 2022/0019572 A1   Jan. 20, 2022

(51) Int. Cl.
*G06F 16/23* (2019.01)
*G06F 17/18* (2006.01)

(52) U.S. Cl.
CPC .......... *G06F 16/2365* (2019.01); *G06F 17/18* (2013.01)

(58) Field of Classification Search
CPC .. G06F 11/0751; G06F 11/00; G06F 16/2365; G06F 17/18
See application file for complete search history.

(56) References Cited

U.S. PATENT DOCUMENTS

| | | | | |
|---|---|---|---|---|
| 8,370,194 | B2* | 2/2013 | Dwarakanath | G06Q 10/04 705/7.37 |
| 10,579,932 | B1* | 3/2020 | Cantrell | G06F 16/24568 |
| 11,256,242 | B2* | 2/2022 | Cella | H04B 17/23 |
| 2015/0199224 | A1* | 7/2015 | Mihnev | H04L 43/08 714/37 |
| 2018/0284735 | A1* | 10/2018 | Cella | H04L 67/12 |
| 2020/0311603 | A1* | 10/2020 | Qiu | G06N 5/04 |
| 2021/0286874 | A1* | 9/2021 | Jin | H04L 63/1425 |
| 2021/0334673 | A1* | 10/2021 | Butvinik | G06N 20/00 |

OTHER PUBLICATIONS

Grubbs, "Procedures for Detecting Outlying Observations in Samples," American Statistical Association and American Society for Quality, Technometrics, vol. 11, No. 1, pp. 1-21, Feb. 1969.
Hochenbaum et al., "Automatic Anomaly Detection in the Cloud via Statistical Learning," Twitter Inc., arXiv preprint arXiv:1704.07706, 13-pages, Apr. 24, 2017.
Rosner, "Percentage Points for a Generalized ESD Many-Outlier Procedure," Taylor & Francis, Ltd. on behalf of American Statistical Association and American Society for Quality, Technometrics, vol. 25, No. 2, pp. 165-172, May 1983.
Tietjen et al., "Some Grubbs-Type Statistics for the Detection of Outliers," Taylor & Francis, Ltd. on behalf of American Statistical Association and American Society for Quality, Technometrics, vol. 14, No. 3, pp. 583-597, Aug. 1972 (Tietjen-Moore Test, retrieved from the internet on Jul. 20, 2020 at <https://www.itl.nist.gov/div898/handbook/eda/section3/eda35h2.htm>).

* cited by examiner

*Primary Examiner* — Merilyn P Nguyen
(74) *Attorney, Agent, or Firm* — Paradice and Li LLP

(57) ABSTRACT

This disclosure provides systems, methods and apparatuses for detecting anomalous activity in an electronic system. In some implementations, a system generates a set of model parameters based on a number (n) of historical datapoints in a dataset, where each datapoint represents activity detected in the electronic system over a respective period of time. The system receives a first new data point for the data set and generates a first test parameter based on a value of the first new datapoint and an average and a measure of spread of the n historical datapoints. The system further compares the first test parameter to the set of model parameters and determines whether the first new datapoint represents an anomaly based at least in part on the comparison.

20 Claims, 7 Drawing Sheets

REAL-TIME ANOMALY DETECTION

TECHNICAL FIELD

This disclosure relates generally to anomaly detection, and specifically to real-time detection of anomalous activity in electronic systems.

DESCRIPTION OF RELATED ART

Many electronic systems and services process large volumes of data in an autonomous or semi-autonomous manner. Some electronic systems implement quality monitoring services to detect anomalous activity which can potentially impact the quality, reliability, or security of the electronic systems. Example quality monitoring services may include, but are not limited to, key performance indicator (KPI) monitoring for business units, data quality monitoring, resource usage monitoring, user activity monitoring for fraud detection and security, user experience monitoring, and the like. Some quality monitoring services may implement statistical algorithms to model anomalous activity as outliers in a dataset. For example, a sudden spike in user login attempts associated with the same user identifier (ID) or email domain may be an indication of fraud or a security breach.

Example statistical tests for outliers include, but are not limited to, Grubbs' test and the generalized extreme studentized deviate (GESD) test. Grubbs' test can be used to detect the presence of a single outlier in a given dataset (assuming the dataset follows a normal distribution). The GESD test is a more generalized version of Grubbs' test and can be used to detect multiple outliners in a given dataset. Existing statistical tests for outliers (including Grubb's test and the GESD test) operate on datasets in batch. In other words, all of the datapoints of a given dataset must be collectively analyzed in order to detect one or more outliers in the dataset. When new datapoints arrive (corresponding to recent activity in the electronic system), the statistical test must be rerun on the entire dataset (including the new datapoints and any historical datapoints) to determine whether any of the new datapoints are outliers or anomalies in the dataset. This creates high latencies in anomaly detection and may cause the electronic system to incur significant delays in responding to anomalous activity (such as by implementing corrective or remedial actions). In some instances, such delays may result in significant or irreparable damage to an electronic system.

Accordingly, there is a need for a low-latency anomaly detection mechanism that can be implemented in near real-time.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for detecting anomalous activity in an electronic system. In some implementations, the method may include steps of generating a set of model parameters based on a number (n) of historical datapoints in a dataset, where each datapoint represents activity detected in the electronic system over a respective period of time; receiving a first new datapoint for the dataset; generating a first test parameter based on a value of the first new datapoint and an average and a measure of spread of the n historical datapoints; comparing the first test parameter to the set of model parameters; and determining whether the first new datapoint represents an anomaly based at least in part on the comparison of the first test parameter to the set of model parameters.

Another innovative aspect of the subject matter described in this disclosure can be implemented in a system for detecting anomalous activity. The system may include one or more processors and a memory storing instructions for execution by the one or more processors. In some implementations, execution of the instructions causes the system to perform operations including generating a set of model parameters based on a number (n) of historical datapoints in a dataset, where each datapoint represents activity detected in an electronic system over a respective period of time; receiving a first new datapoint for the dataset; generating a first test parameter based on a value of the first new datapoint and an average and a measure of spread of the n historical datapoints; comparing the first test parameter to the set of model parameters; and determining whether the first new datapoint represents an anomaly based at least in part on the comparison of the first test parameter to the set of model parameters.

Another innovative aspect of the subject matter described in this disclosure can be implemented as a method for detecting anomalous activity in an electronic system. In some implementations, the method may include steps of generating a set of model parameters based on a number (n) of historical datapoints in a dataset, where each datapoint represents activity detected in the electronic system over a respective period of time; receiving a new datapoint for the dataset; generating a test parameter based on a value of the new datapoint and an average and a measure of spread of the n historical datapoints; comparing the test parameter to the set of model parameters; selectively comparing the first test parameter to a critical value based on the comparison of the test parameter to the set of model parameters, where the critical value is associated with the test parameter in accordance with a generalized extreme studentized deviate (GESD) test; and determining whether the new datapoint represents an anomaly based at least in part on the comparison of the test parameter to the set of model parameters.

BRIEF DESCRIPTION OF THE DRAWINGS

The example implementations are illustrated by way of example and are not intended to be limited by the figures of the accompanying drawings. Like numbers reference like elements throughout the drawings and specification.

DETAILED DESCRIPTION

Figure 1:
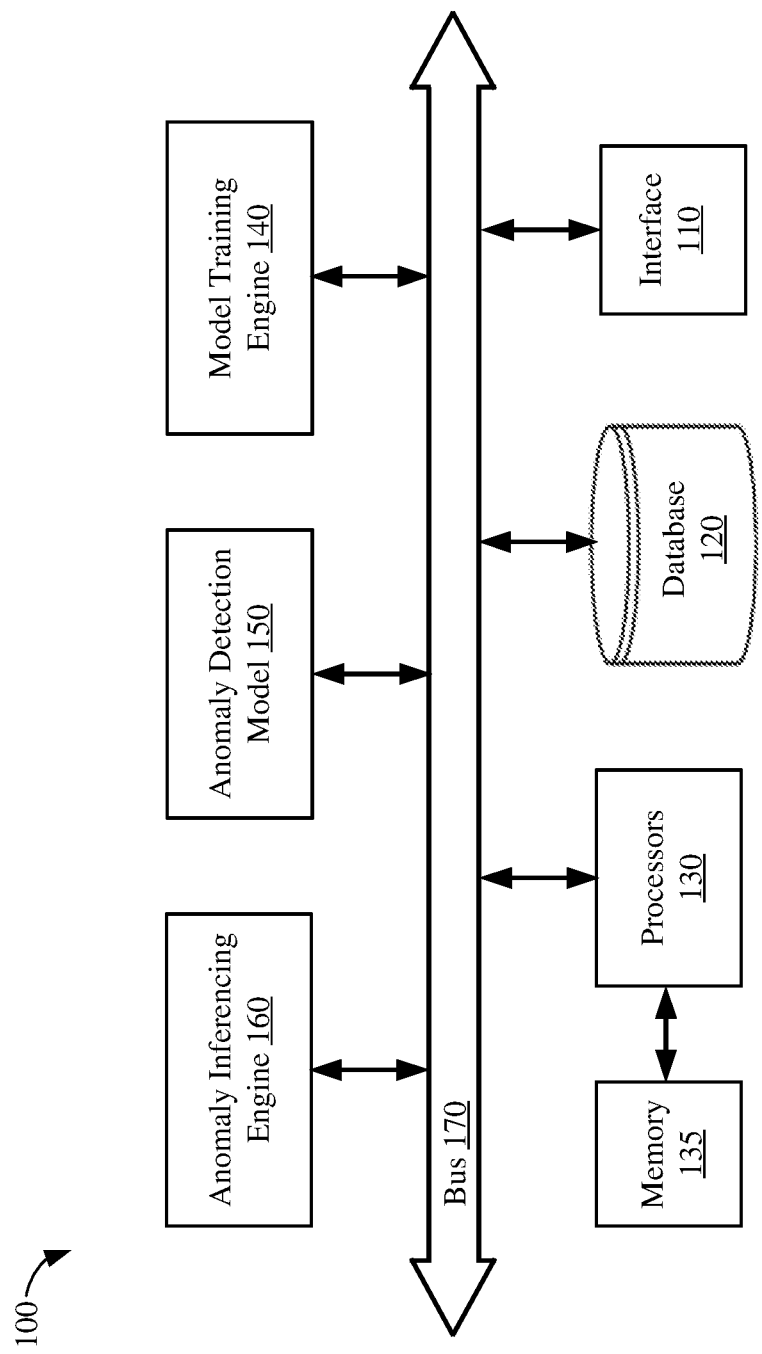
FIG. 1 shows an example anomaly detection system, according to some implementations.

Implementations of the subject matter described in this disclosure may be used to detect anomalous activity in an electronic system. As discussed above, some quality monitoring services implement statistical algorithms to model anomalous activity as outliers in a dataset. However, existing statistical tests for outliers operate on datasets in batch, resulting in high latencies in anomaly detection. Aspects of the present disclosure perform anomaly detection in multiple phases, including a training phase and an inferencing phase. During the training phase, an anomaly detection model is generated based on historical data in a dataset. The historical data may represent past or previously recorded activity associated with the electronic system. In other words, the training phase may be performed "offline" (e.g., not in real-time) on a large batch of historical data. During the inferencing phase, the anomaly detection model can be used to determine whether newly acquired data for the dataset represents an anomaly. More specifically, the new data may be tested for outliers against the anomaly detection model, in lieu of the historical data. The anomaly detection model represents a significantly smaller set of data than the historical data itself. As a result, the inferencing phase may be performed in real-time (or near real-time) as new data is added to the dataset, thereby reducing the latency of anomaly detection.

Various implementations of the subject matter disclosed herein provide one or more technical solutions to the technical problem of detecting anomalous activity in an electronic system that could adversely affect the security, reliability, or quality of services provided by the electronic system. More specifically, various aspects of the present disclosure provide a unique computing solution to a unique computing problem that did not exist prior to electronic systems that are capable of processing large volumes of data in an autonomous or semi-autonomous manner, much less, detecting anomalies in such data. By training an anomaly detection model based on historical data and subsequently using the model for inferencing anomalies in real-time data, the subject matter disclosed herein provide meaningful improvements to the performance and security of electronic systems that process large volumes of data in an autonomous or semi-autonomous manner, and more specifically to reducing the latency of anomaly detection in such electronic systems. As such, implementations of the subject matter disclosed herein are not an abstract idea such as organizing human activity or a mental process that can be performed in the human mind.

Moreover, various aspects of the present disclosure effect an improvement in the technical field of real-time anomaly detection. The detection of a statistical outlier or anomaly in a very large dataset, much less the training of an anomaly detection model based on a large batch of historical data or the real-time inferencing of anomalies using the anomaly detection model, cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

FIG. 1 shows an example anomaly detection system 100, according to some implementations. Although described herein with respect to detecting anomalous activity in an electronic system, various aspects of the anomaly detection system 100 disclosed herein may be generally applicable for real-time anomaly detection in a variety of applications. For example, the training of an anomaly detection model and the subsequent inferencing of anomalies using the anomaly detection model may provide a low-cost (e.g., low storage cost and low computation cost), low-latency operation for detecting anomalies in any suitable dataset.

The anomaly detection system 100 is shown to include an input/output (I/O) interface 110, a database 120, one or more data processors 130, a memory 135 coupled to the data processors 130, a model training engine 140, an anomaly detection model 150, and an anomaly inferencing engine 160. In some implementations, the various components of the anomaly detection system 100 may be interconnected by at least a data bus 170, as depicted in the example of FIG. 1. In other implementations, the various components of the anomaly detection system 100 may be interconnected using other suitable signal routing resources.

The interface 110 may include a screen, an input device, and other suitable elements that allow a user or other electronic system (not shown for simplicity) to provide information to the anomaly detection system 100 and/or to retrieve information from the anomaly detection system 100. Example information that can be provided to the anomaly detection system 100 may include data that is representative of activity in, or otherwise associated with, an electronic system. Such data may be used for quality monitoring services including, but not limited to, key performance indicator (KPI) monitoring for business units, data quality monitoring, resource usage monitoring, user activity monitoring for fraud detection and security, and user experience monitoring. In some implementations, the data representative of activity in the electronic system may include historical data (representing past activity), new data (representing recent activity), and the like. Example information that can be retrieved from the anomaly detection system 100 may include model parameters, test parameters, inferencing results, anomaly flags or indicators, and the like.

The database 120, which may represent any suitable number of databases, may store any suitable information pertaining to the activity of the electronic system, the training or updating of an anomaly detection model, and the inferencing of anomalies in the electronic system. For example, the information may include model parameters associated with the anomaly detection model 150, historical data (or training data) for training the anomaly detection model 150, new data for inferencing anomalous activity in the electronic system, and the like. In some aspects, the historical data may be discarded or removed from the database upon completion of the training phase (e.g., after the anomaly detection model 150 is trained). In some other aspects, the new data may be discarded or removed from the database 120 upon completion of the inferencing phase (e.g., after a determination is made as to whether the new data is an anomaly). In some implementations, the database 120 may be a relational database capable of presenting the data sets to a user in tabular form and capable of manipulating the data sets using relational operators. In some aspects, the database 120 may use Structured Query Language (SQL) for querying and maintaining the database.

The data processors 130, which may be used for general data processing operations (such as manipulating the datasets stored in the database 120), may be one or more suitable processors capable of executing scripts or instructions of one or more software programs stored in the anomaly detection system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The model training engine 140 may be used for training the anomaly detection model 150 to infer whether newly acquired data for a given dataset include anomalies. In some implementations, the model training engine 140 may generate the anomaly detection model 150 based on a number (n) of historical datapoints belonging to the dataset. More specifically, the model training engine 140 may determine a respective model parameter for each historical datapoint ($x_j$) based on an average (x) and a measure of spread (s) of the dataset. An example measure of spread may include, but is not limited to, a standard deviation of the dataset. In some aspects, each model parameter may be computed in accordance with a statistical test for outliers, such as the GESD test. For example, each model parameter may represent a test statistic ($R_j$) as defined by the GESD test. The model training engine 140 may further select a subset of model parameters ($R_i$) to be included in the anomaly detection model 150. In some implementations, the number of model parameters included in the anomaly detection model 150 may correspond to a number (r) of anomalies to be tested in accordance with a GESD test (e.g., where r is an upper bound on the number of anomalies that can be detected by the GESD test). In other words, upon completion of the training phase, the anomaly detection model 150 may include the r largest model parameters $R_i$ computed by the model training engine 140 (e.g., $R_i \in \{R_1, R_2, \ldots, R_r\}$).

The anomaly inferencing engine 160 may use the anomaly detection model 150 to determine whether newly acquired data for the dataset include anomalies. In some implementations, the anomaly inferencing engine 160 may generate a test parameter ($R_t$), based on a new datapoint ($x_t$), that can be compared against the anomaly detection model 150. For example, the test parameter $R_t$ also may be computed, based on the average x and the measure of spread s of the dataset, in accordance with the GESD test. In some implementations, the test parameter $R_t$ may be computed using the same values for the average and the measure of spread used to compute each model parameter $R_i$. As described above, the anomaly detection model 150 includes the r largest model parameters $R_i$ associated with the dataset. In other words, the model parameters $R_i$ represent the test statistics that would have been tested for outliers, in accordance with the GESD test, prior to receiving the new datapoint $x_t$. Thus, for the new datapoint $x_t$ to even be considered as a potential anomaly, the value of the test parameter $R_t$ must be greater than or equal to the value of at least one of the model parameters $R_i$ in the anomaly detection model 150. If the value of the test parameter $R_t$ is less than the value of the smallest model parameter $R_i$ in the anomaly detection model 150, the new datapoint $x_t$ will not be considered an anomaly according to the GESD test.

As described above, the value of the test parameter $R_t$ depends on the average and the measure of spread of the dataset. Aspects of the present disclosure recognize that some average and measure of spread calculations can be sensitive to anomalies. For example, the mean or standard deviation of a dataset may change after a new datapoint is added to the dataset (particularly when the new datapoint is an anomaly). In some implementations, the anomaly detection system 100 may implement average and measure of spread calculations that are relatively insensitive to anomalies. In some aspects, a median (rather than mean) value of the datapoints in a dataset may be used to represent the average x of the dataset. For example, the addition of an anomaly will have little (if any) effect on the median value of a large dataset. In some other aspects, the measure of spread s of the dataset may be based on a median absolute deviance (MAD) of the dataset. For example, the MAD for a set of n datapoints may be defined as the median of the absolute differences of each datapoint from the median of the n datapoints. The measure of spread s can then be computed as a scalar multiple of the MAD. Similar to the median, the addition of an anomaly will have little (if any) effect on the measure of spread based on the MAD of the dataset.

If the value of the test parameter $R_t$ is greater than or equal to the value of at least one of the model parameters $R_i$ in the anomaly detection model 150, the anomaly inferencing engine 160 may further analyze the test parameter $R_t$ to determine whether the new datapoint $x_t$ is indeed an anomaly. In some implementations, the anomaly inferencing engine 160 may compare the test statistic $R_t$ to a critical value ($\lambda_t$) upon determining that the test parameter $R_t$ is greater than or equal to the value of at least one of the model parameters $R_i$. The critical value $\lambda_t$ may be a unique value associated with $R_t$ as defined by the GESD test. In some implementations, the anomaly inferencing engine 160 may infer that the new datapoint $x_t$ is an anomaly only if the value of the test parameter $R_t$ is greater than the critical value $\lambda_t$. Otherwise, if $R_t$ is less than or equal to $\lambda_t$, the anomaly inferencing engine 160 may determine that the new datapoint $x_t$ is not an anomaly. In some implementations, the anomaly inferencing engine 160 may add the test parameter $R_t$ to the anomaly detection model 150 if the test parameter is greater than at least one of the model parameters $R_i$. For example, the anomaly inferencing engine 160 may replace the smallest model parameter $R_i$ with the anomaly detection model 150 with the test parameter $R_t$.

As described above, the anomaly inferencing engine 160 may determine whether a new datapoint $x_t$ for a given dataset is an anomaly by comparing the corresponding test parameter $R_t$ with the set of model parameters $R_i$ in the anomaly detection model 150 and, if warranted, comparing the test parameter $R_t$ to the critical value $\lambda_t$. In contrast with conventional GESD tests, the anomaly inferencing engine 160 may determine whether the new datapoint is an anomaly without recomputing each of the test statistics $R_j$ in the context of the entire dataset (including the n historical datapoints in addition to the new datapoint). This results in significant reductions in computational complexity and storage requirements, as the historical data can be discarded once the anomaly detection model 150 is trained. Accordingly, the anomaly inferencing engine 160 can perform anomaly detection "online" or in real-time, as new data is added to the dataset.

The particular architecture of the anomaly detection system 100 shown in FIG. 1 is but one example of a variety of different architectures within which aspects of the present disclosure may be implemented. For example, in other implementations, the anomaly detection system 100 may not include a model training engine 140, the functions of which may be implemented by the processors 130 executing corresponding instructions or scripts stored in the memory 135. In some other implementations, anomaly detection model 150 may be stored as information or data in the database 120. Still further, in some implementations, the functions of the anomaly inferencing engine 160 may be performed by the processors 130 executing corresponding instructions or scripts stored in the memory 135.

Figure 2A:
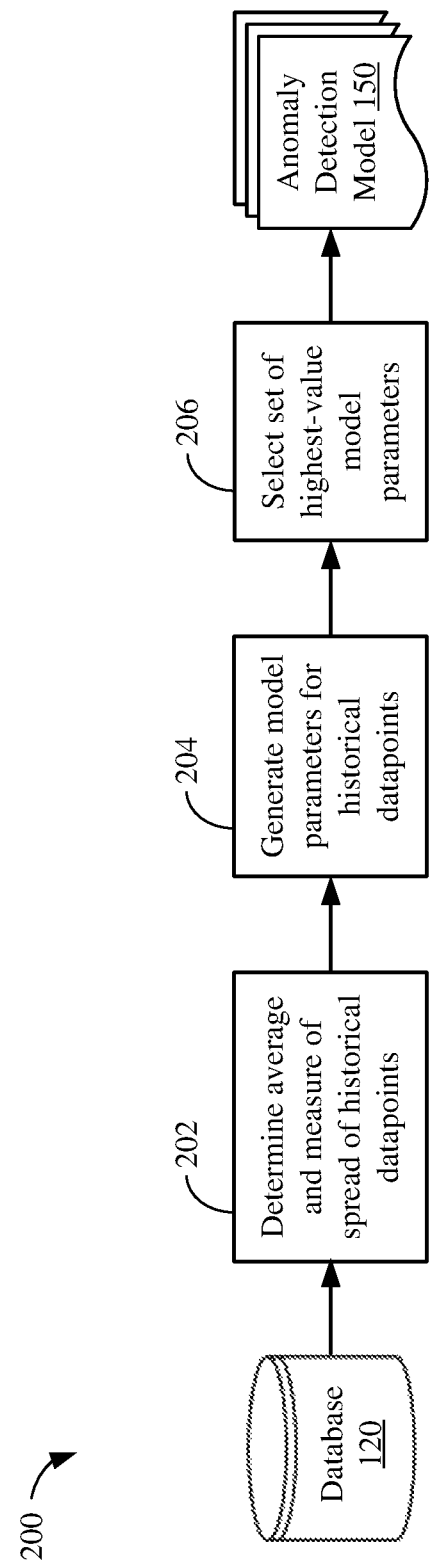
FIGS. 2A and 2B show example process flows that may be employed by the anomaly detection system of FIG. 1, according to some implementations.

FIG. 2A shows a high-level overview of an example process flow 200 that may be employed by the anomaly detection system of FIG. 1. More specifically, the process flow 200 depicts an example training operation, according to some implementations. In some implementations, the example process flow 200 may be performed offline on a large batch of historical data (or training data) stored in the database 120. Each historical datapoint used in the training process may belong to a given dataset.

At block 202, an average (x) and a measure of spread (s) is determined for a number (n) of historical datapoints stored in the database 120. In some implementations, the average x may be the median value of the n historical datapoints and the measure of spread s may be a scalar multiple of the MAD of the n historical datapoints. In some aspects, the measure of spread s for a set of n historical datapoints $\{x_1, x_2, \ldots, x_n\}$ may computed as follows:

$$med_n = median(\{x_1, x_2, \ldots, x_n\})$$

$$MAD = median(\{|x_j - med_n| ; j=1,2, \ldots, n\})$$

$$s = 1.4826 * MAD$$

At block 204, a respective model parameter ($R_j$) is generated for each of the n historical datapoints. In some implementations, the model parameters $R_j$ may be computed as a test statistic in accordance with the GESD test. For example, each model parameter $R_j$ may be computed based on the value of a respective datapoint $x_j$ and the average x and the measure of spread s of the dataset (e.g., the n historical datapoints), as follows:

$$R_j = \frac{|x_j - x|}{s}$$

At block 206, the largest or highest-value model parameters $R_j$ are selected for the anomaly detection model 150. In some implementations, the anomaly detection model 150 may comprise a subset of model parameters $R_i$ representing a number (r) of the highest-value model parameters $R_j$ associated with the n historical datapoints. In some other implementations, the selection of the r highest-value model parameters $R_i$ may be performed while generating the model parameters (e.g., combining blocks 204 and 206). For example, the model parameters $R_i$ may be computed over a number (i) of iterations, as follows:

$$R_i = \frac{max|x_j - x|}{s}$$

where the observation that maximizes $$\frac{|x_j - x|}{s}$$

is removed for each successive iteration until r observations have been removed. As a result, the anomaly detection model 150 may include an ordered set of model parameters $R_i \in \{R_1, R_2, \ldots, R_r\}$, where $R_1 > R_2 > \ldots > R_r$.

Figure 2B:
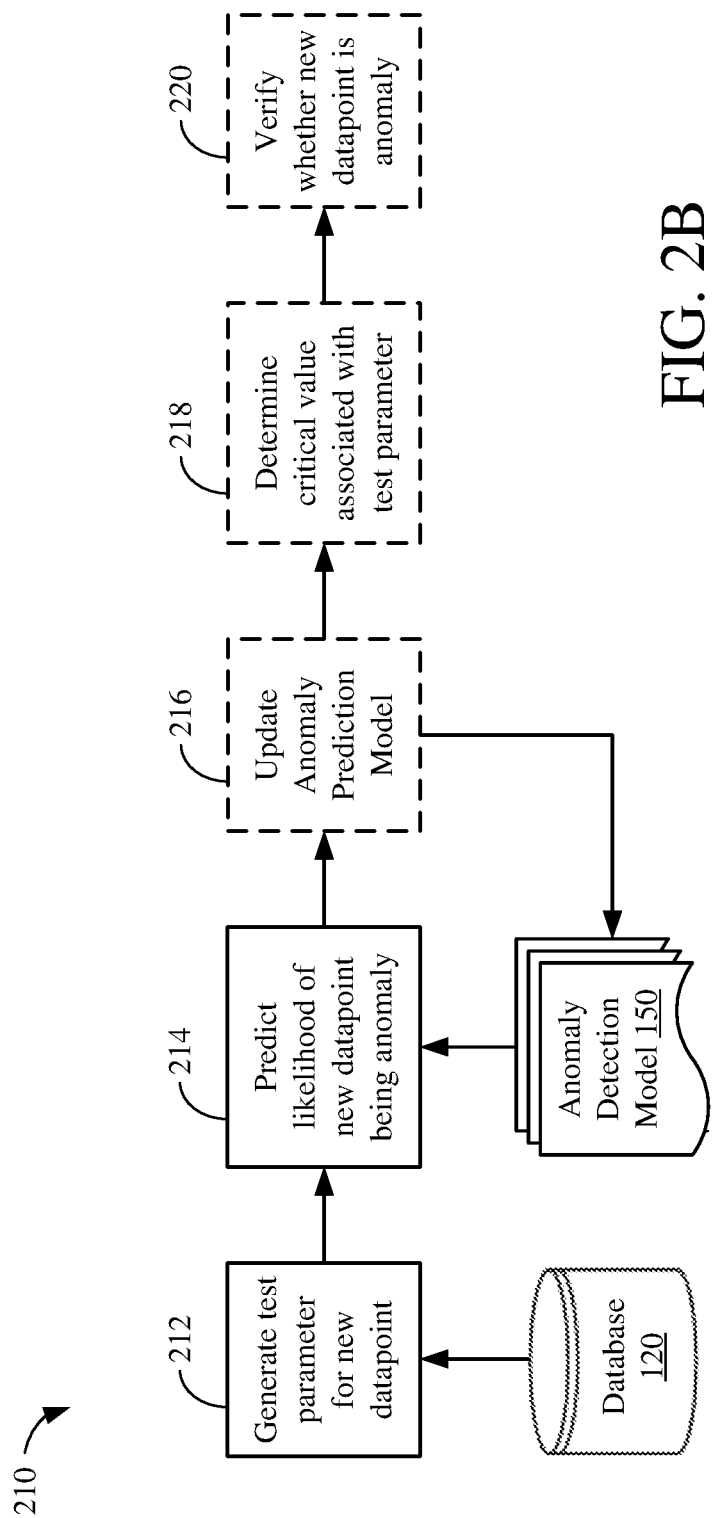

As described in greater detail with respect to FIG. 2B, the anomaly detection model 150 can be used (in lieu of the n historical datapoints) to infer whether datapoints received in the future represent anomalies in the dataset. Accordingly, the anomaly detection model 150 provides a fast and accurate mechanism for detecting anomalies in accordance with the GESD test. In some implementations, the training operation of FIG. 2A need not be repeated once the anomaly detection model 150 is trained for a given dataset. For example, the anomaly detection model 150 may be iteratively updated based on future anomaly inferencing results rather than being retrained using the n historical datapoints. Thus, in some implementations, the n historical datapoints can be discard or otherwise removed from the database 120 after the anomaly detection model 150 is trained.

FIG. 2B shows a high-level overview of another example process flow 210 that may be employed by the anomaly detection system of FIG. 1. More specifically, the process flow 210 depicts an example inferencing operation, according to some implementations. In some implementations, the example process flow 210 may be performed online or in real-time as new datapoints are received or recorded in the database 120. Each datapoint used in the inferencing process may be associated with a given dataset.

At block 212, a test parameter ($R_t$) is generated for a new datapoint ($x_t$) acquired from the database 120. In some implementations, the test parameter Rt may be computed as a test statistic in accordance with the GESD test. For example, the test statistic $R_t$ may be computed based on the value of the new datapoint $x_t$ and the average x and the measure of spread s of the dataset (e.g., as computed in block 202 of FIG. 2A with respect to the n historical datapoints), as follows:

$$R_t = \frac{|x_t - x|}{s}$$

At block 214, the anomaly detection model 150 is used to predict the likelihood of the new datapoint being anomaly. In some implementations, the prediction is made by determining whether the value of the test parameter $R_t$ is greater than or equal to the value of at least one of the model parameters $R_i$ included in the anomaly detection model 150. For example, the test parameter $R_t$ may be compared with each of the model parameter $R_i$, in succession (e.g., i=1, 2, . . . , r), until a model parameter $R_i$ is found for which the condition $R_t \geq R_i$ is satisfied or all of the model parameters have been exhausted. As described with respect to FIG. 1, the new datapoint $x_t$ would not satisfy the criteria for being an anomaly (as defined by the GESD test) if the value of the test parameter $R_t$ is less than the values of each of the r model parameters $R_i$ in the anomaly detection model 150. Accordingly, the process flow 210 may terminate at block 214 if no model parameter $R_i$ is found for which the condition $R_t \geq R_i$ is satisfied.

On the other hand, the new datapoint $x_t$ may (or may not) be an anomaly if the value of the test parameter $R_t$ is greater than the value of at least one of the model parameters $R_i$. In some implementations, the process flow 210 may proceed to block 216 if at least one model parameter $R_i$ is found for which the condition $R_t \geq R_i$ is satisfied. At block 216, the anomaly detection model 150 is updated to include the test parameter $R_t$. In some implementations, the anomaly detection model 150 may be updated by removing the lowest-value model parameter (e.g., $R_r$) in the anomaly detection model 150 and inserting the test parameter $R_t$ before the model parameter $R_i$ in the ordered set. As shown in the example process flow 210 of FIG. 2B, the test parameter $R_t$ may be added to the anomaly detection model 150 as long as the value of the test parameter $R_t$ is greater than (or equal to) the value of at least one of the model parameters $R_i$ (e.g., even if the new datapoint $x_t$ is not determined to be an anomaly).

At block 218, a critical value ($\lambda_t$) is determined for the test parameter Rt. The critical value $\lambda_t$ may be a unique value associated with $R_t$, as defined by the GESD test, which does not depend on the values of any of the datapoints in the dataset. In some implementations, the critical value $\lambda_t$ may be looked up from a table of critical values. In some other implementations, the critical value $\lambda_t$ may be computed based on the position (i) of the associated test parameter $R_t$ in the ordered set of model parameters $R_i \in \{R_1, R_2, \ldots, R_r\}$, as follows:

$$\lambda_t = \frac{(n+1-i)t_{p,n-i}}{\sqrt{(n-i+t_{p,n-i}^2)(n-i)}}$$

where $t_{p,v}$ is the 100p percentile from the t distribution with v degrees of freedom, for a significance level $\alpha$, where:

$$p = 1 - \frac{\alpha}{2(n-i+1)}$$

At block 220, the test parameter $R_t$ is compared against the critical value $\lambda_t$ to verify whether the new datapoint $x_t$ is an anomaly. In some implementations, the new datapoint $x_t$ is verified to be an anomaly only if the test parameter $R_t$ is greater than the corresponding critical value $\lambda_t$ (e.g., $R_t > \lambda_t$). Otherwise, if the test parameter $R_t$ is less than or equal to the critical parameter $\lambda_t$, the new datapoint $x_t$ is determined not to be an anomaly. In some implementations, an anomaly detection flag may be asserted when an anomaly is detected in the dataset. The anomaly detection flag may be used to alert an electronic system, or an operator of the electronic system, that anomalous activity has been detected which could potentially require corrective or remedial actions to be taken by the electronic system or operator thereof. For example, the anomalous activity may be indicative of a security breach, fraud, misuse of system resources, a performance bottleneck, or a failure of the electronic system itself.

As described above, the example process flow 210 determine whether a new datapoint $x_t$ for a given dataset is an anomaly by comparing the corresponding test parameter $R_t$ with the set of model parameters $R_i$ in the anomaly detection model 150 and, if warranted, comparing the test parameter $R_t$ to the critical value $\lambda_t$. Among other advantages, the inferencing operation of FIG. 2B may determine whether the new datapoint is an anomaly without recomputing each of the test statistics $R_j$ in the context of the entire dataset. Moreover, the anomaly detection model 150 may be dynamically updated each time the inferencing operation is performed. The updated anomaly detection model 150 may then be used to infer whether a subsequent new datapoint for the dataset is an anomaly (e.g., by repeating the example process flow 210 for the new datapoint). This results in significant reductions in computational complexity and storage requirements, as the datapoints associated with the dataset can be discarded once an inference is made as to whether the datapoints represent anomalies.

Figure 3:
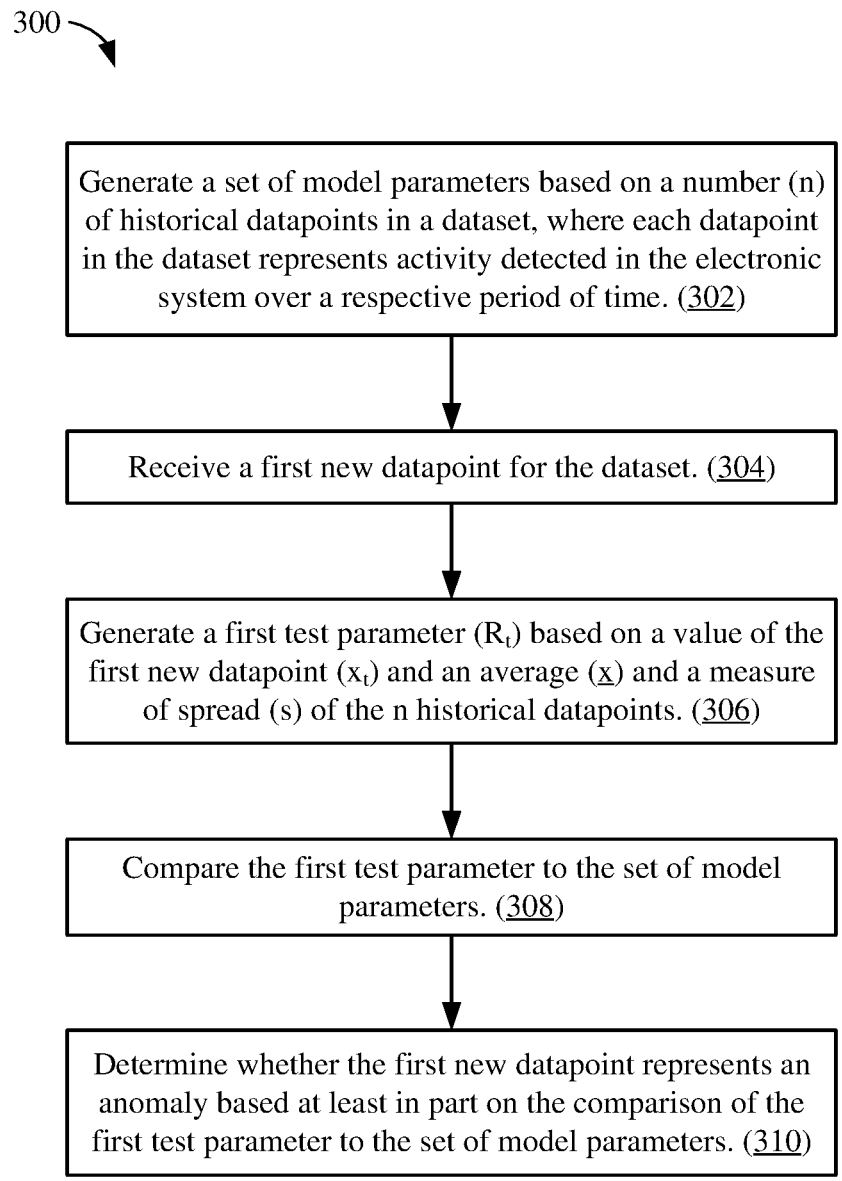
FIG. 3 shows an illustrative flow chart depicting an example operation for detecting anomalous activity in an electronic system, according to some implementations.

FIG. 3 shows an illustrative flow chart depicting an example operation 300 for detecting anomalous activity in an electronic system, according to some implementations. The example operation 300 may be performed by one or more processors of an anomaly detection system. In some implementations, the example operation 300 may be performed using the anomaly detection system 100 of FIG. 1. However, it is to be understood that the example operation 300 may be performed by other suitable systems, computers, or servers.

At block 302, the anomaly detection system 100 generates a set of model parameters based on a number (n) of historical datapoints in a dataset, where each datapoint in the dataset represents activity detected in the electronic system over a respective period of time. At block 304, the anomaly detection system 100 receives a first new datapoint for the dataset. At block 306, the anomaly detection system 100 generates a first test parameter ($R_t$) based on a value of the first new datapoint ($x_t$) and an average (x) and a measure of spread (s) of the n historical datapoints. At block 308, the anomaly detection system 100 compares the first test parameter to the set of model parameters. At block 310, the anomaly detection system 100 determines whether the first new datapoint represents an anomaly based at least in part on the comparison of the first test parameter to the set of model parameters.

In some implementations, the test parameter may be determined as $$R_t = \frac{|x_t - x|}{s}.$$

In some implementations, the average may be a median value of the n historical datapoints and the measure of spread may be based on a median absolute deviance (MAD) of the n historical datapoints. For example, in some aspects, the measure of spread may be determined as s=1.4826*MAD. In some implementations, the generating of the set of model parameters in block 302 may include generating a respective model parameter ($R_j$) for each historical datapoint ($x_j$) in the dataset, where $$R_j = \frac{|x_j - x|}{s},$$

and selecting a number (r) of the model parameters to be included in the set, where a size of the set is limited to r model parameters. In some aspects, each of the selected model parameters may have a higher value than any of the remaining n−r model parameters not selected for the set.

In some implementations, the determining of whether the first new datapoint represents an anomaly in block 310 may include determining whether a value of the first test parameter is greater than or equal to a value of at least one of the model parameters in the set, where the first new datapoint is determined not to be an anomaly responsive to determining that the value of the first test parameter is less than the values of each of the model parameters in the set. In some implementations, the determining of whether the first new datapoint represents an anomaly in block 310 may further include determining whether the value of the first parameter is greater than a critical value responsive to determining that the value of the first test parameter is greater than or equal to the value of at least one of the model parameters in the set, where the first new datapoint is determined to be an anomaly responsive to determining that the value of the first test parameter is greater than the critical value. For example, the critical value may be associated with the test parameter in accordance with a generalized extreme studentized deviate (GESD) test.

In some implementations the example operation 300 may further include updating the set of model parameters to include the first test parameter responsive to determining that the value of the first test parameter exceeds the value of at least one of the model parameters in the set. For example, the updating of the set of model parameters may include removing, from the set, the model parameter having the lowest value among the model parameters in the set and adding the first test parameter to the set of model parameters. In some implementations, the example operation 300 may further include receiving a second new datapoint for the dataset, generating a second test parameter based on a value of the second new datapoint and the average and the measure of spread of the n historical datapoints, comparing the second test parameter to the updated set of mode parameters, and determining whether the second new datapoint represents an anomaly based at least in part on the comparison.

Figure 4:
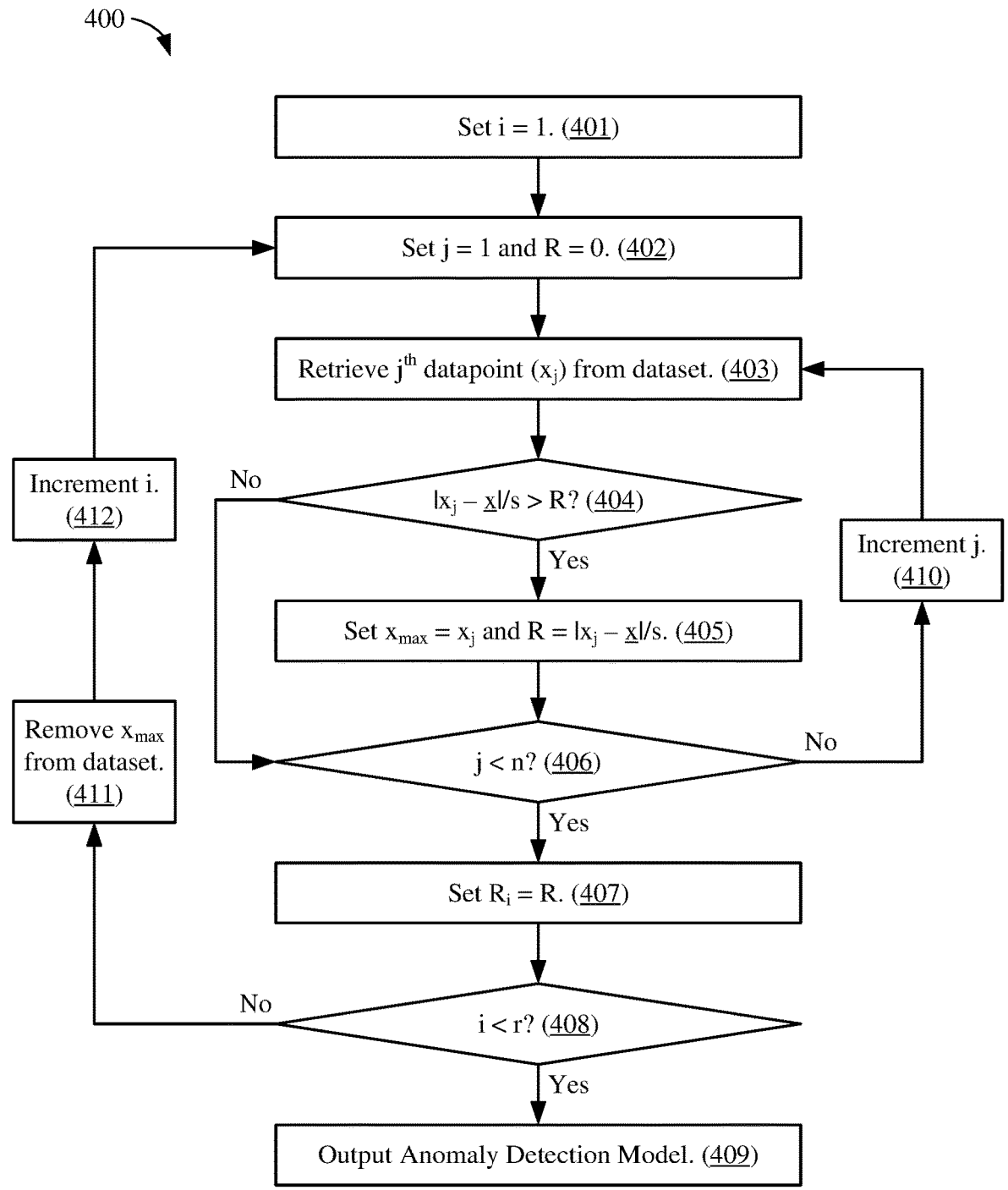
FIG. 4 shows an illustrative flow chart depicting an example operation for training an anomaly detection model, according to some implementations.

FIG. 4 shows an illustrative flow chart depicting an example operation 400 for training an anomaly detection model, according to some implementations. The example operation 400 may be performed by one or more processors of an anomaly detection system. In some implementations, the example operation 400 may be performed using the anomaly detection system 100 of FIG. 1. More specifically, the example operation 400 may be performed by the model training engine 140 of the anomaly detection system 100. However, it is to be understood that the example operation 400 may be performed by other suitable systems, computers, or servers.

At block 401, the model training engine 140 initializes a first index (i) to a value of 1. At block 402, the model training engine 140 initializes a second index (j) and a test statistic (R) to values of 1 and 0, respectively. At block 403, the model training engine 140 retrieves the $j^{th}$ datapoint ($x_j$) of a dataset stored in the database 120. At block 404, the model training engine 140 determines whether $$\frac{|x_j - x|}{s} > R,$$

where x and s represent an average and a measure of spread, respectively, of the dataset. If the condition in block 404 is not met, the operation 400 proceeds to block 406. If the condition in block 404 is satisfied, the operation 400 proceeds to block 405, where the model training engine 140 sets a maximum datapoint value ($x_{max}$) to the value of the $j^{th}$ datapoint $x_j$, and further sets the value of R equal to $$\frac{|x_j - x|}{s}.$$

At block 406, the model training engine 140 determines whether j<n, where n represents the number of datapoints in the dataset. If the condition in block 406 is not met, the operation 400 proceeds to block 410, where the model training engine 140 increments the value of the second index j. The operation 400 then proceeds to block 403, where the model training engine 140 retrieves the next ($j^{th}$) datapoint from the dataset.

If the condition in block 406 is satisfied, the operation 400 proceeds to block 407, where the model training engine 140 sets the value of the $i^{th}$ model parameter ($R_i$) to the value of the current test statistic R. At block 408, the model training engine 140 determines whether i<r, where r represents an upper bound on the number of anomalies that can be detected by a corresponding anomaly detection operation. If the condition in block 408 is not met, the operation 400 proceeds to block 411, where the model training engine 140 removes the maximum datapoint value $x_{max}$ from the dataset. The operation 400 then proceeds to block 412, where the model training engine 140 increments the value of the first index i. The operation 400 then proceeds to block 402, where the model training engine 140 resets the second index j and the test statistic R to values of 1 and 0, respectively. If the condition in block 408 is satisfied, the operation 400 proceeds to block 409, where the model training engine 140 outputs the anomaly detection model.

Figure 5:
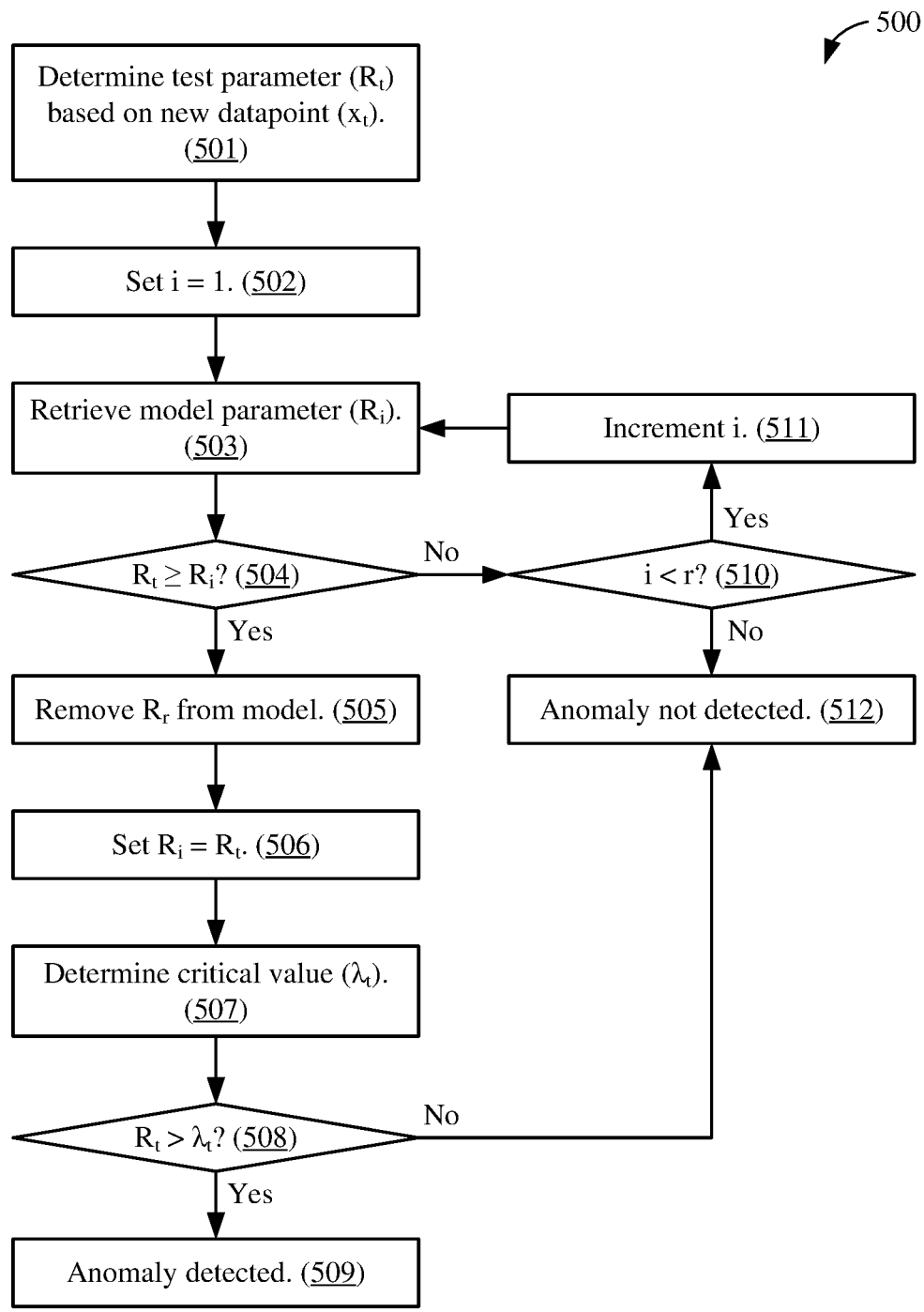
FIG. 5 shows an illustrative flow chart depicting an example operation for inferencing anomalies based on an anomaly detection model, according to some implementations.

FIG. 5 shows an illustrative flow chart depicting an example operation 500 for inferencing anomalies based on an anomaly detection model, according to some implementations. The example operation 500 may be performed by one or more processors of an anomaly detection system. In some implementations, the example operation 500 may be performed using the anomaly detection system 100 of FIG. 1. More specifically, the example operation 500 may be performed by the anomaly inferencing engine 160 of the anomaly detection system 100. However, it is to be understood that the example operation 400 may be performed by other suitable systems, computers, or servers.

At block 501, the anomaly inferencing engine 160 determines a test parameter ($R_t$) based on a newly acquired datapoint ($x_t$) for a given dataset. At block 502, the anomaly inferencing engine 160 initializes an index (i) to a value of 1. At block 503, the anomaly inferencing engine 160 retrieves the $i^{th}$ model parameter from the anomaly detection model. At block 504, the anomaly inferencing engine 160 determines whether $R_t \geq R_i$. If the condition in block 504 is not met, the operation 500 proceeds to block 510, where the anomaly inferencing engine 160 further determines whether i<r, where r represents an upper bound on the number of anomalies that can be detected by a corresponding anomaly detection operation. If the condition in block 510 is not met, the operation 500 proceeds to block 512, where the anomaly inferencing engine 160 determines that the new datapoint $x_t$ is not an anomaly. If the condition in block 510 is satisfied, the operation 500 proceeds to block 511, where the anomaly inferencing engine 160 increments the value of the index i. The operation 500 then proceeds to block 503, where the anomaly inferencing engine 160 retrieves the next ($i^{th}$) model parameter from the anomaly detection model.

If the condition in block 504 is satisfied, the operation 500 proceeds to block 505, where the anomaly inferencing engine 160 removes the model parameter having the lowest value (Rr) from the anomaly detection model. At block 506, the anomaly inferencing engine 160 adds the test parameter $R_t$ in the $i^{th}$ position in the anomaly detection model and shifts the model parameters $R_i$-$R_{r-1}$ down one position. At block 507, the anomaly inferencing engine 160 determines a critical value ($\lambda_t$) associated with the test parameter $R_t$. At block 508, the anomaly inferencing engine 160 determines whether $R_t > \lambda_t$. If the condition in block 508 is not met, the operation 500 proceeds to block 512, where the anomaly inferencing engine 160 determines that the new datapoint $x_t$ is not an anomaly. Otherwise, if the condition in block 508 is satisfied, the operation 500 proceeds to block 509, where the anomaly inferencing engine 160 determines that the new datapoint $x_t$ is an anomaly.

Figure 6:
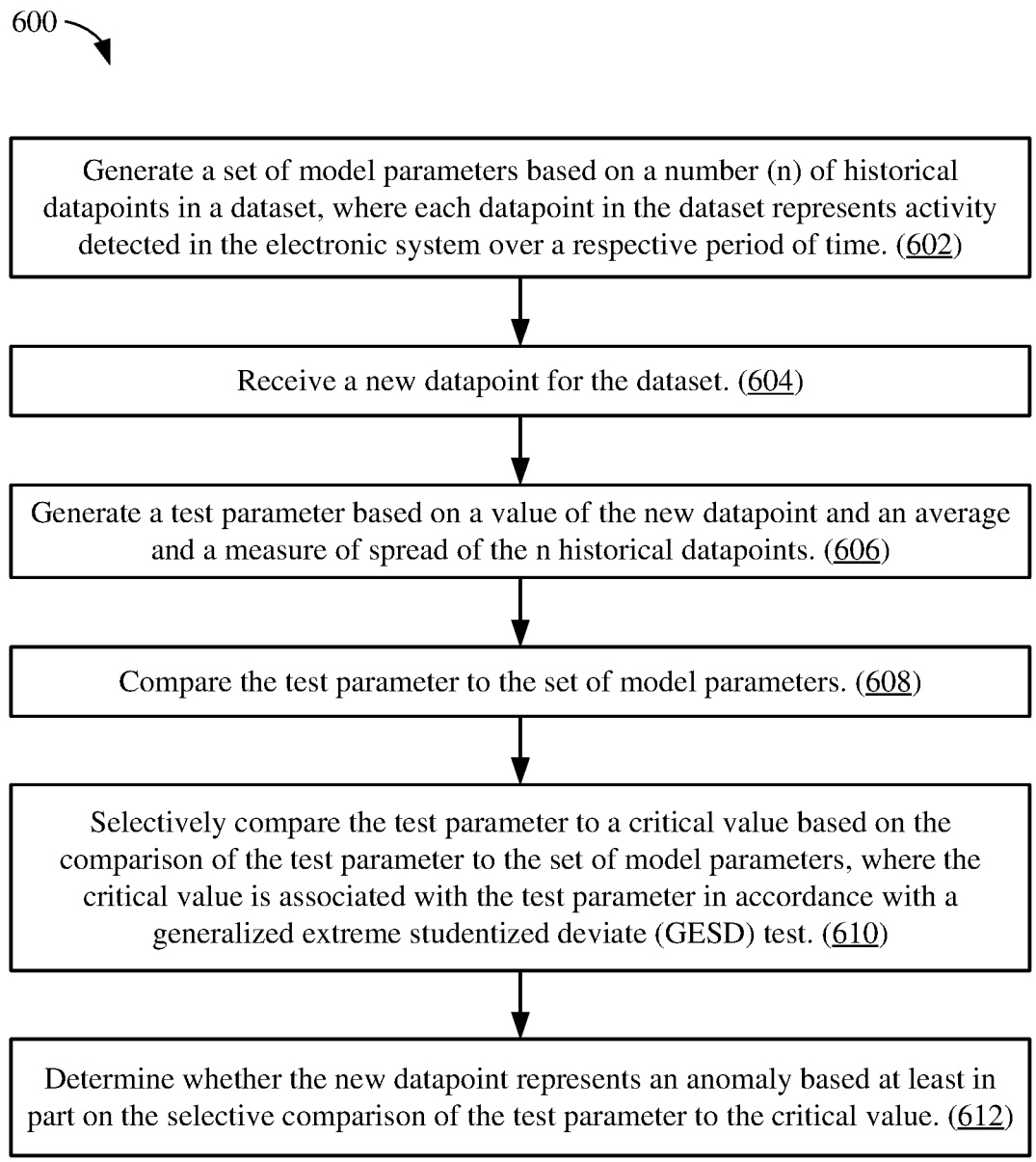
FIG. 6 shows another illustrative flow chart depicting an example operation for detecting anomalous activity in an electronic system, according to some implementations.

FIG. 6 shows another illustrative flow chart depicting an example operation 600 for detecting anomalous activity in an electronic system, according to some implementations. The example operation 600 may be performed by one or more processors of an anomaly detection system. In some implementations, the example operation 600 may be performed using the anomaly detection system 100 of FIG. 1. However, it is to be understood that the example operation 600 may be performed by other suitable systems, computers, or servers.

At block 602, the anomaly detection system 100 generates a set of model parameters based on a number (n) of historical datapoints in a dataset, where each datapoint in the dataset represents activity detected in the electronic system over a respective period of time. At block 604, the anomaly detection system 100 receives a new datapoint for the dataset. At block 606, the anomaly detection system 100 generates a test parameter based on a value of the new datapoint and an average and a measure of spread of the n historical datapoints. At block 608, the anomaly detection system 100 compares the test parameter to the set of model parameters. At block 610, the anomaly detection system 100 selectively compares the test parameter to a critical value based on the comparison of the test parameter to the set of model parameters, where the critical value is associated with the test parameter in accordance with a generalized extreme studentized deviate (GESD) test. At block 612, the anomaly detection system 100 determines whether the new datapoint represents an anomaly based at least in part on the selective comparison of the test parameter to the critical value.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of detecting anomalous activity in an electronic system, the method performed by one or more processors and comprising:
generating a set of model parameters based on a number (n) of historical datapoints in a dataset, each datapoint in the dataset representing activity detected in the electronic system over a respective period of time;
receiving a first new datapoint for the dataset;
generating a first test parameter ($R_t$) based on a value ($x_t$) of the first new datapoint and an average (x) and a measure of spread (s) of the n historical datapoints;
comparing the first test parameter to the set of model parameters; and
determining whether the first new datapoint represents an anomaly based at least in part on the comparison of the first test parameter to the set of model parameters.

2. The method of claim 1, wherein
$$R_t = \frac{|x_t - x|}{s}.$$

3. The method of claim 1, wherein the average is a median value of the n historical datapoints and the measure of spread is based on a median absolute deviance (MAD) of the n historical datapoints.

4. The method of claim 2, wherein s=1.4826*MAD.

5. The method of claim 1, wherein the generating of the set of model parameters comprises:
generating a respective model parameter ($R_j$) for each historical datapoint ($x_j$) in the dataset, wherein
$$R_j = \frac{|x_j - x|}{s};$$
and
selecting a number (r) of the model parameters to be included in the set, wherein a size of the set is limited to r model parameters.

6. The method of claim 5, wherein each of the selected model parameters has a higher value than any of the remaining n−r model parameters not selected for the set.

7. The method of claim 1, wherein the determining of whether the first new datapoint represents an anomaly comprises:
determining whether a value of the first test parameter is greater than or equal to a value of at least one of the model parameters in the set, the first new datapoint being determined not to be an anomaly responsive to determining that the value of the first test parameter is less than the values of each of the model parameters in the set.

8. The method of claim 7, wherein the determining of whether the first new datapoint represents an anomaly further comprises:
determining whether the value of the first test parameter is greater than a critical value responsive to determining that the value of the first test parameter is greater than or equal to the value of at least one of the model parameters in the set, the first new datapoint being determined to be an anomaly responsive to determining that the value of the first test parameter is greater than the critical value.

9. The method of claim 8, wherein the critical value is associated with test parameter in accordance with a generalized extreme studentized deviate (GESD) test.

10. The method of claim 7, further comprising:
updating the set of model parameters to include the first test parameter responsive to determining that the value of the first test parameter exceeds the value of at least one of the model parameters in the set.

11. The method of claim 10, wherein the updating comprises:
removing, from the set, the model parameter having the lowest value among the model parameters in the set; and
adding the first test parameter to the set of model parameters.

12. The method of claim 11, further comprising:
receiving a second new datapoint for the dataset;
generating a second test parameter based on a value of the second new datapoint and the average and the measure of spread of the n historical datapoints;
comparing the second test parameter to the updated set of model parameters; and
determining whether the second new datapoint represents an anomaly based at least in part on the comparison.

13. A system for detecting anomalous activity, comprising:
one or more processors; and
a memory storing instructions that, when executed by the one or more processors, causes the system to perform operations including:
generating a set of model parameters based on a number (n) of historical datapoints in a dataset, each datapoint in the dataset representing activity detected in an electronic system over a respective period of time;
receiving a first new datapoint for the dataset;
generating a first test parameter ($R_t$) based on a value ($x_t$) of the first new datapoint and an average (x) and a measure of spread (s) of the n historical datapoints;
comparing the first test parameter to the set of model parameters;
determining whether the first new datapoint represents an anomaly based at least in part on the comparison of the first test parameter to the set of model parameters.

14. The system of claim 13, wherein
$$R_t = \frac{|x_t - x|}{s}.$$

15. The system of claim 13, wherein the average is a median value of the n historical datapoints and the measure of spread is based on a median absolute deviance (MAD) of the n historical datapoints, wherein s=1.4826*MAD.

16. The system of claim 13, wherein execution of the instructions for generating the set of model parameters causes the system to perform operations further comprising:
generating a respective model parameter ($R_j$) for each historical datapoint ($x_j$) in the dataset, wherein
$$R_j = \frac{|x_j - x|}{s};$$
and selecting a number (r) of the model parameters to be included in the set, wherein a size of the set is limited to r model parameters and each of the selected model parameters has a higher value than any of the remaining n−r model parameters not selected for the set.

17. The system of claim 13, wherein execution of the instructions for determining whether the first new datapoint represents an anomaly causes the system to perform operations further comprising:
   determining whether a value of the first test parameter is greater than or equal to a value of at least one of the model parameters in the set, the first new datapoint being determined not to be an anomaly responsive to determining that the value of the first test parameter is less than the values of each of the model parameters in the set; and
   determining whether the value of the first test parameter is greater than a critical value responsive to determining that the value of the first test parameter is greater than or equal to the value of at least one of the model parameters in the set, wherein the critical value is associated with the test parameter in accordance with a generalized extreme studentized deviate (GESD) test, the first new datapoint being determined to be an anomaly responsive to determining that the value of the first test parameter is greater than the critical value.

18. The system of claim 17, wherein execution of the instructions causes the system to perform operations further comprising:
   updating the set of model parameters to include the first test parameter responsive to determining that the value of the first test parameter exceeds the value of at least one of the model parameters in the set.

19. The system of claim 18, wherein execution of the instructions for updating the set of model parameters causes the system to perform operations further comprising:
   removing, from the set, the model parameter having the lowest value among the model parameters in the set; and
   adding the first test parameter to the set of model parameters.

20. A method of detecting anomalous activity in an electronic system, the method performed by one or more processors and comprising:
   generating a set of model parameters based on a number (n) of historical datapoints in a dataset, each datapoint in the dataset representing activity detected in the electronic system over a respective period of time;
   receiving a new datapoint for the dataset;
   generating a test parameter ($R_t$) based on a value of the new datapoint and an average and a measure of spread of the n historical datapoints;
   comparing the test parameter to the set of model parameters;
   selectively comparing the test parameter to a critical value based on the comparison of the test parameter to the set of model parameters, wherein the critical value is associated with the test parameter in accordance with a generalized extreme studentized deviate (GESD) test; and
   determining whether the new datapoint represents an anomaly based at least in part on the selective comparison of the test parameter to the critical value.

\* \* \* \* \*